US006959157B2

(12) United States Patent
Nakayama

(10) Patent No.: US 6,959,157 B2
(45) Date of Patent: Oct. 25, 2005

(54) SHADING CORRECTION METHOD FOR A SENSOR, AND COLOR IMAGE FORMING APPARATUS

(75) Inventor: Toshiki Nakayama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/642,733

(22) Filed: Aug. 19, 2003

(65) Prior Publication Data

US 2004/0042807 A1 Mar. 4, 2004

(30) Foreign Application Priority Data

Aug. 28, 2002 (JP) ....................................... 2002-248917

(51) Int. Cl.[7] ........................ G03G 15/01; G03G 15/00; H04N 1/40

(52) U.S. Cl. ............................ 399/39; 399/49; 358/461

(58) Field of Search ............................. 399/15, 39, 40, 399/41, 49; 358/448, 461

(56) References Cited

U.S. PATENT DOCUMENTS 5,077,605 A 12/1991 Ikeda et al.
5,343,282 A * 8/1994 Kazaki et al. ................ 399/39
5,552,876 A * 9/1996 Muroki et al. ................ 399/40
5,614,934 A * 3/1997 Yoshida et al. ......... 358/461 X
5,963,756 A * 10/1999 Sakai et al. .................... 399/39
6,243,542 B1 * 6/2001 Fujimoto et al. ............. 399/49
6,418,281 B1 7/2002 Ohki ........................... 399/49
6,463,227 B1 * 10/2002 Denton et al. ................ 399/49
6,560,418 B2 * 5/2003 Campbell et al. ............. 399/49

FOREIGN PATENT DOCUMENTS

EP 1 291 731 3/2003

* cited by examiner

*Primary Examiner*—Sandra L. Brase
(74) *Attorney, Agent, or Firm*—Fitzpatrick, Cella, Harper & Scinto

(57) ABSTRACT

Disclosed are a shading correction method for a sensor capable of accurately detecting color tint of a toner patch without using any white-color reference to execute shading correction in the sensor, a shading correction apparatus for a sensor, and a color image forming apparatus. In the shading correction, light reflected by a rich K toner patch formed on a transferring material is detected, a shading correction value for the sensor is calculated based on detected data, and correction is executed using the shading correction value during operation for detecting a toner patch for color stabilization.

9 Claims, 7 Drawing Sheets

SHADING CORRECTION METHOD FOR A SENSOR, AND COLOR IMAGE FORMING APPARATUS

BACKGROUND OF THE INVENTION

1. Field of the Invention

The present invention relates to color image forming apparatuses, such as copying machines and printers of electrophotographic types, electrostatic recording types, and the like, and sensors usable in such color image forming apparatuses. Particularly, the present invention relates to shading correction in those color image forming apparatuses and sensors.

2. Related Background Art

FIG. 8A exemplifies a sensor for detecting light reflected by a toner patch, which uses a photodiode. FIG. 8B exemplifies a circuit for converting an output current of the photodiode into a voltage. The photodiodes 201-R, 201-G, and 201-B, receive light transmitted through red (R), green (G), and blue (B) color filters 202-R, 202-G, 202-B, respectively. Denoted at 105 is an LED serving as a light source. Denoted at 104 is a toner patch of a detection object formed on a transferring material 1. Light components transmitted through the R, G and B color filters 202-R, 202-G, 202-B out of reflected light 203 from the toner patch 104 enter the photodiodes 201, respectively, and photocurrent is generated in each photodiode. The photocurrent is converted into a voltage by each resistor 204-R, 204-G or 204-B, and the voltage is amplified by each amplifier 205-R, 205-G, or 205-B to create an output voltage V206-R, V206-G or V206-B.

FIG. 9 exemplifies another sensor for detecting light reflected by the toner patch 104. The sensor of FIG. 9 is different from the sensor of FIG. 8 in that light diffracted by a diffraction grating 208 without using any color filters is detected by a photodiode array 207 (207-1 to 207-n) comprised of an n number of pixels. Colors (R, G and B light components, or spectral outputs in respective wavelength ranges) of the toner patch 104 formed on the transferring material 1 can be detected by using those sensors or pixels.

On the other hand, in the case of an image forming apparatus of an electrophotographic type using an intermediate transfer member, obtainable density and chromaticity of an image are likely to fluctuate if variations occur in each portion of the apparatus due to changes in its ambience and its longtime use. Particularly, in the case of a color image forming apparatus, there is a fear that colors lose their balance even in the event of slight fluctuations in their densities, and accordingly constant density and gradation need to be maintained for each color at all times.

Therefore, for each color toner, there are prepared several kinds of process conditions of exposure amount, developing bias, and the like corresponding to respective absolute humidities, and a gradation correcting unit such as a lookup table (LUT). Based on the absolute humidity measured by a temperature-humidity sensor, appropriate process condition and gradation correction value are selected on each occasion. Further, in order to obtain constant density, gradation, and color tint even if variations occur in each portion of the apparatus during its use, a toner image (also referred to as a patch or a toner patch) for detecting the density is formed with each toner on the intermediate transfer member, and the patch is detected by a sensor. Thus-detected results are fed back to the process conditions of the exposure amount, the developing bias, and the like to control the density of each color such that a stable image can be obtained.

Furthermore, Canon has proposed a sensor for detecting the color tint of a patch fixed on the transferring material such that feedback can be executed with respect to factors including influences of transfer and fixation which are excluded from feedback objects in the above-discussed density detecting sensor, and influence at the time of mixing colors which cannot be detected. Based on results detected by this sensor, feedback operations are performed to the process conditions and image processing such that color stabilization of the image can be further improved.

However, when the color tint of the patch fixed on the transferring material is detected to obtain a stable image in a color image forming apparatus using the conventional sensor as illustrated in FIGS. 8A, 8B or FIG. 9, the following problems arise.

In both cases where the color tint is detected using plural color filters and plural photodiodes as illustrated in FIG. 8A, and where a spectrum of the light reflected by the patch is created by the diffraction grating or prism, and the spectrum light is detected by plural sensors to detect the color tint of the patch as illustrated in FIG. 9, errors are likely to occur in detected colors due to dispersions or variations in sensitivities of the sensors, resistance values of the IV (current-voltage) converting resistors, transmissivities of the color filters, and amounts of light depending on positions of the patches and the sensors.

In normal sensors, shading correction is carried out to compensate for those dispersions. More specifically, light reflected by a white-color reference board is read to obtain and store a coefficient for making the output from each pixel of the sensor constant for each pixel, and the individual detected results are corrected using these coefficients. However, it is difficult in the image forming apparatus to stably maintain the color tint of the reference board for a long time due to contamination by the toner and a change in color of the reference board with age. In addition, preparation of the white-color reference board itself results in an increase in the cost. Further, although it can be considered that the transferring material is used as the reference, the transferring material is difficult to use as the reference for the color-tint detecting sensor since the color of the transferring material is not always white.

As described in the foregoing, in conventional shading correction methods as discussed above, the cost is likely to rise, and precision of detected information is liable to lower since stable shading correction cannot be achieved. Accordingly, in the image forming apparatus capable of controlling operation based on such information, precision of its color stabilizing control is likely to decrease.

SUMMARY OF THE INVENTION

It is an object of the present invention to provide a shading correction method for a sensor capable of accurately detecting color tint of a toner patch without using any white-color reference to execute shading correction in the sensor, a shading correction apparatus for a sensor, and a color image forming apparatus.

According to one aspect of the present invention, there is provided a color image forming apparatus which includes a sensor adapted to detect chromaticity of a patch to be formed on a transferring medium; a correcting unit adapted to perform shading correction of an output from the sensor; and a calculating unit adapted to calculate a shading correction value of the correcting unit based on a detected value obtained by said sensor's detecting a patch for calculation of the shading correction value to be formed on a transferring material.

In the color image forming apparatus of the present invention, the patch for calculation of the shading correction value can be a black toner patch whose optical density is equal to or more than one (or 1). The sensor can be a sensor comprised of a light source having an emission spectrum ranging over overall visible light, and at least three sets of pixels provided with respective filters having respective spectral characteristics, and the calculating unit can obtain such correction coefficients that outputs from the respective pixels of the sensor can satisfy a predetermined output ratio calculated from the emission spectrum of the light source, spectral sensitivity of the sensor, spectral transmissivities of the respective filters, and spectral reflectivity of toner.

The sensor can also be a sensor comprised of a light source having an emission spectrum ranging over overall visible light, a spectrum-obtaining unit, and a plurality of pixels for receiving spectral light obtained by the spectrum-obtaining unit, and the calculating unit can obtain such correction coefficients that outputs from the respective pixels of the sensor can satisfy a predetermined output ratio calculated from the emission spectrum of the light source, spectral sensitivity of the sensor, spectral reflectivity of toner, and wavelength ranges of light incident on the respective pixels, and can correct the output of the sensor using the correction coefficients during operation for detecting color tint of an image formed on the transferring medium.

Further, the sensor can be a sensor comprised of at least three light sources having respective different emission spectra, and a pixel or at least two pixels having equal spectral sensitivity, and the calculating unit can obtain such individual correction coefficients that outputs from the respective pixels of the sensor corresponding to the respective light sources can satisfy a predetermined output ratio calculated from the emission spectra of the light sources, spectral sensitivity of the sensor, and spectral reflectivity of toner.

Furthermore, the sensor can be a sensor whose amplification factor during operation for converting incident light into a voltage is variable, or a sensor in which a voltage obtained by conversion from incident light is amplified by an amplifier with a variable amplification factor, and the amplification factor can be set to a relatively large value during operation for obtaining shading correction information of the sensor, and can be set to a relatively small value during operation for detecting color tint of an image formed on the transferring material.

The sensor can also be a charge storage sensor which reads charge generated by incident light after charge storage for a predetermined time, and storage time can be set to a relatively long time during operation for shading correction of the sensor, and can be set to a relatively short time during operation for detecting color tint of an image formed on the transferring material.

The color image forming apparatus of the present invention can further include a plurality of image forming portions adapted to form images of different colors; a transferring portion adapted to transfer the images formed by the image forming portions to the transferring material to form a color image on the transferring material; and an adjusting portion for adjusting color image forming conditions of the image forming portions based on an output value of the sensor corrected by the correcting unit.

According to another aspect of the present invention, there is provided a shading correction method for a sensor for detecting chromaticity of a patch to be formed on a transferring medium by a color image forming apparatus. The shading correction method includes a first detecting step of detecting, by the sensor, a patch for calculation of a shading correction value to be formed on a transferring medium by the color image forming apparatus; a calculating step of calculating the shading correction value of a correcting unit based on a detected output obtained in the first detecting step; a second detecting step of detecting a patch for adjustment of color image forming conditions; a correcting step of correcting an output of the sensor obtained in the second detecting step based on the shading correction value; and a setting step of setting the color image forming conditions based on a corrected output obtained in the correcting step.

These and further aspects and features of the invention will become apparent from the following detailed description of preferred embodiments thereof in conjunction with the accompanying drawings.

DESCRIPTION OF THE PREFERRED EMBODIMENTS

Embodiments of a shading correction method for a sensor and a color image forming apparatus according to the present invention will hereinafter be described.

(First Embodiment)

A first embodiment of a shading correction method for a sensor will be described with reference to the drawings. A patch detection for color stabilization subsequent to the shading correction will also be described. As disclosed herein, the shading correction means a total correction of sensitivity variations of a sensor, emission characteristic variations of a light source, light amount variations at a detection location of a sensor, spectral transmissivity variations of a filter, and so forth (this is because not only variations of light intensity and sensor sensitivity but also wavelength variations can be error factors in the case of a sensor for detecting color tint).

Figure 1A:
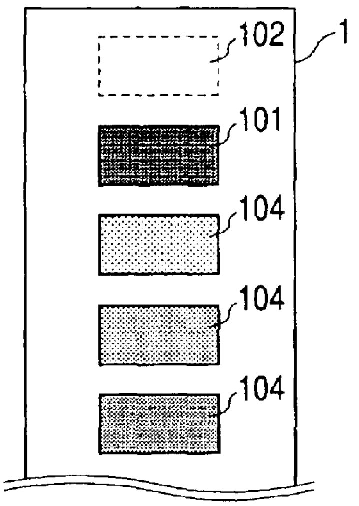
FIG. 1A is a view illustrating correction patches used in a first embodiment according to the present invention.
Figure 1B:
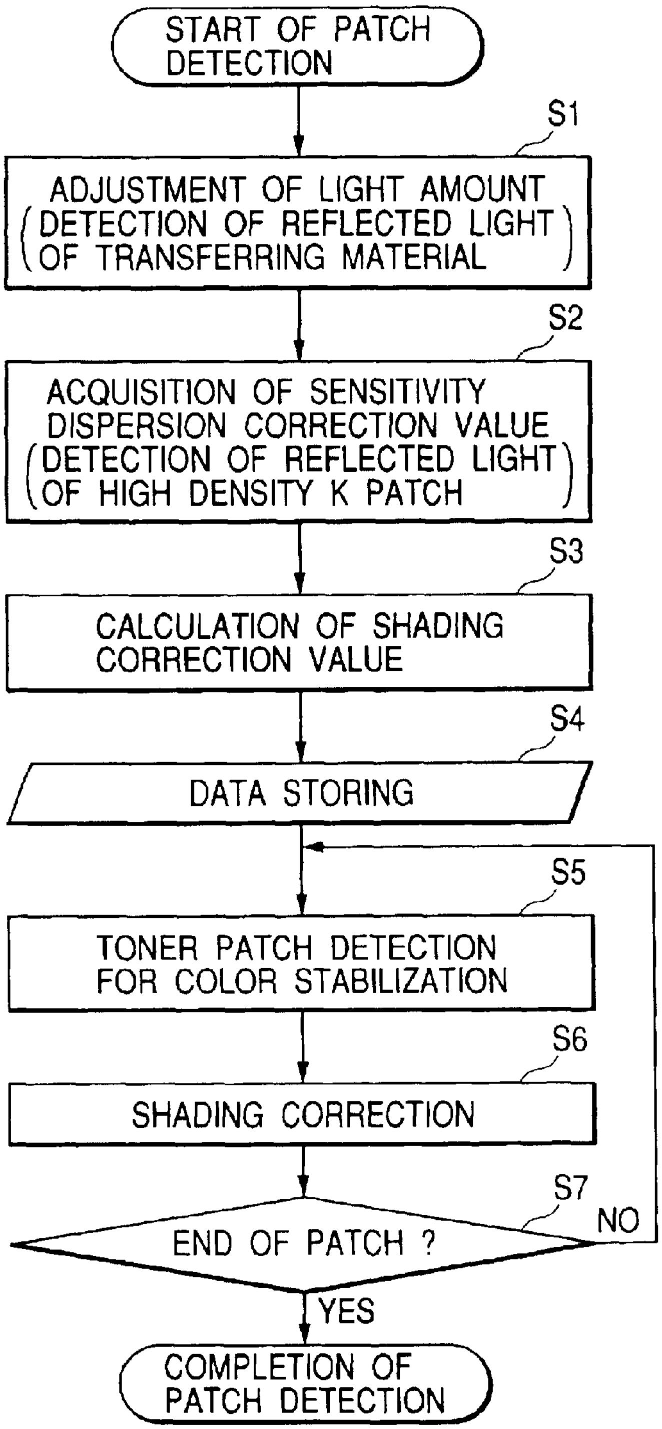
FIG. 1B is a chart illustrating a flow of shading correction in the first embodiment.
Figure 2:
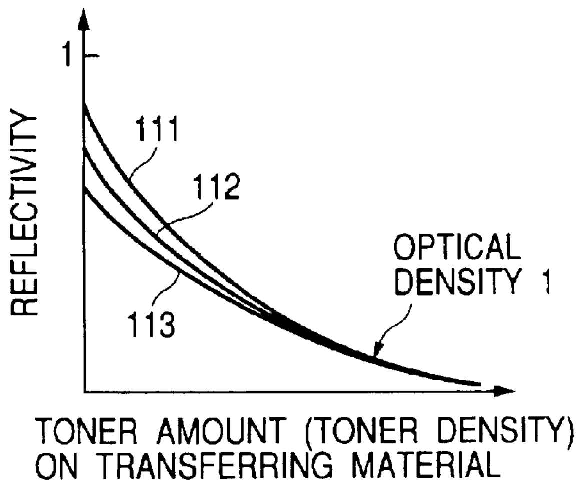
FIG. 2 is a graph illustrating the relationship between the amount of K toner on a transferring material and the reflectivity.
Figure 8A:
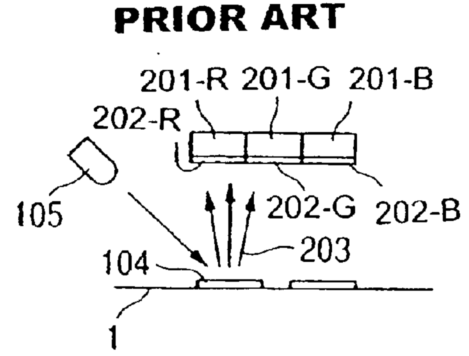
FIG. 8A PRIOR ART
FIG. 8A is a view illustrating a sensor for detecting the color tint of light reflected by a patch using a filter.
Figure 8B:
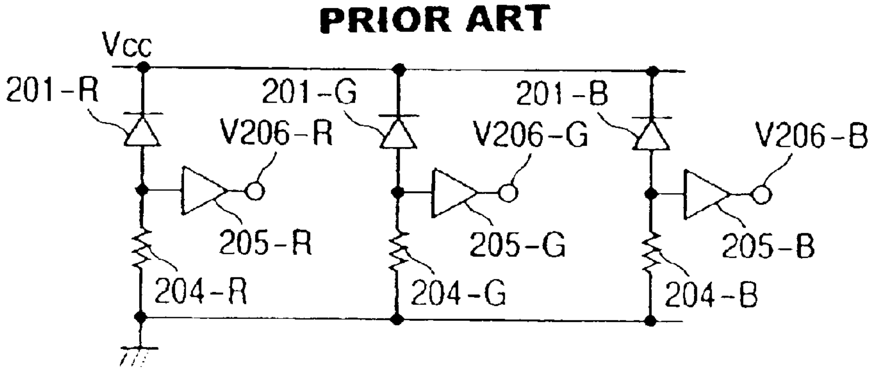
FIG. 8B PRIOR ART
FIG. 8B is a view illustrating a circuit for converting a photocurrent generated in the sensor into a voltage.

FIG. 1A illustrates examples of patches to be used for correction, and FIG. 1B illustrates a correction flow. FIG. 2 is a graph illustrating the relationship between the amount of toner of a K (black) toner patch formed on a transferring material and its reflectivity. As a sensor for detecting the reflectivity of the toner patch, the sensor having a photodiode array provided with R, G and B color filters as illustrated in FIGS. 8A and 8B is adopted for the following discussion.

FIG. 2 illustrates three characteristics, i.e., relationships between amounts of toners on different transferring materials and their reflectivities. A characteristic line 111 corresponds to a case where a transferring material having the highest reflectivity (namely a white transferring material) is used. On the other hand, a characteristic line 113 corresponds to a case where a transferring material having the lowest reflectivity is used. A characteristic line 112 corresponds to an intermediate case. When the amount of toner is small, the reflectivities of the K toner patches fluctuate as illustrated in FIG. 2 since the reflectivity is influenced by the transferring material. However, as the amount of toner increases to a certain value such as a value creating its optical density of one (1), the characteristic is independent of the underlaid transferring material since the transferring material begins to disappear and light reflected by carbon black forming the K toner patch almost occupies light from the patch. Utilizing such characteristic, the present invention employs a rich K toner patch for detecting the output variations of the sensor without using either of a white-color reference or a transferring material as a reference. The white-color reference is likely to raise the cost, and maintaining its color condition is difficult. As for the transferring material, its color tint and reflectivity are liable to vary depending on the kind of paper. In cases of toners of C, M and Y other than K, color tint delicately varies under influences of transfer and fixation even if the toner is deposited with such an amount that receives no influence of the transferring material. Therefore, C, M and Y toners are not suitable to be used as the reference for a color sensor in which outputs of R, G and B sensors need to be adjusted to establish a predetermined ratio between these outputs.

A shading correction method and patch detection method for color stabilization will be described with reference to FIGS. 1A and 1B. Denoted at 102 is a portion of a region of the transferring material, or a patch which has the highest reflectivity among patches to be detected for color stabilization control. This is a region for controlling the light amount. Initially, the light amount is adjusted such that the sensor can exhibit the maximum output using the patch or the transferring material whose detected reflectivity is the highest. Thereby, the dynamic range of the sensor can be most effectively utilized.

In a step 1 (indicated by S1 in FIG. 1B) in the flow of FIG. 1B, the light amount is controlled such that the sensor can acquire a signal with an appropriate amount within a non-saturation range in which the sensor is not saturated. Although the control of the light amount is not necessarily needed, it is desirable for effective use of the dynamic range of the sensor. The sensor output Vi (i=R, G or B) corresponding to each color filter can be written as $$Vi = a \times P \times Si \times Fi \times Rt \quad (1)$$

where P is the light amount of the light source, Si (i=R, G or B) is the sensitivity of each sensor, Fi (i=R, G or B) is the transmission coefficient of the filter corresponding to each sensor, Rt is the reflectivity of the transferring material, and a is the proportional constant.

In the step 1, the sensor observes the surface 102 of the transferring material whose reflectivity is higher than that of the case where the toner patch exists. At this moment, current flowing in the LED, i.e., the light amount P in the relation (1), is adjusted such that the pixel whose output is maximum can exhibit an output that is as large as possible within the non-saturation range. Specifically, the current is reduced to lower the light amount at the time when even one output of the pixel in the sensor reaches the saturation level. The current is enlarged to increase the light amount at the time when the maximum value of the output of the pixel in the sensor is smaller than the saturation level.

In a step S2, the sensor detects light reflected by a rich K toner patch 101, and data for shading correction of the sensor is acquired. The density level of the rich K toner patch is equal to or greater than the optical density of one (or 1). During this step, the sensor can receive light reflected by the K toner having a stable spectral reflectivity, since the surface of the transferring material is covered with K toner and there is no influence of difference in color of the transferring material, as shown in FIG. 2. Outputs of the respective pixels corresponding to the R, G and B filters obtained by detecting the rich K toner patch x can be written as $$Vr(K) = a \times Pc \times Sr \times Fr \times RK \quad (2)$$

$$Vg(K) = a \times Pc \times Sg \times Fg \times RK \quad (3)$$

$$Vb(K) = a \times Pc \times Sb \times Fb \times RK \quad (4)$$

where Pc is the light amount of the light source subsequent to the light amount adjustment in the step 1, and RK is the reflectivity of the rich K toner patch.

In a step S3, a correction value for shading correction is calculated. When color filters are provided on the sensor, outputs from pixels of the sensor corresponding to the respective color filters are not equal even under ideal conditions. Those outputs show different values depending on spectral reflectivity of the patch to be detected, emission spectrum of the light source, transmissivity characteristic of the color filter, and spectral sensitivity of the pixel of the sensor. Accordingly, the shading correction needs to be performed as follows. Sensor outputs are corrected to different predetermined values corresponding to the respective color filters. Alternatively, after all the sensor outputs are corrected to be equal to a common value, the outputs are then calculated considering the above factors at the stage of signal processing. In the latter case, efficiency is hampered since two steps are needed, though the correction can be executed. In this embodiment, the former case is adopted, and the outputs are made equal to the sensor output of the pixel provided with the R filter.

Based on optical characteristics of components constituting the sensor and the spectral reflectivity of the toner, an ideal output ratio x:y:z between respective R, G and B pixels is beforehand calculated using the K toner. When the sensor outputs vary under influences of sensitivity variations of the sensor and other factors and the ratio between relations (2), (3) and (4) is represented by $$Vr(K):Vg(K):Vb(K) = x:y \times c1:z \times c2 \quad (5),$$

reciprocals 1/c1 and 1/c2 of coefficients c1 and c2 representing the variations are obtained from relations (2) to (5) as $$1/c\mathbf{1}=y\times Vr(K)/x\times Vg(K) \tag{6}$$

$$1/c\mathbf{2}=z\times Vr(K)/x\times Vb(K) \tag{7}$$

The variations can be corrected by thus obtaining 1/c1 and 1/c2 and multiplying measured values by them, respectively.

In a step S4, those correction coefficients 1/c1 and 1/c2 are stored in a storing unit (not shown) in the image forming apparatus. After that, the patch 104 is detected for color stabilization of the image forming apparatus in a step S5, the detected data is corrected using the data stored in the storing unit in a step S6, and end of detection of a predetermined number of patches is judged in a step S7. The detection of the patch is thus finished.

Correction similar to the above-discussed method can be performed even in cases where plural sensor elements or pixels are provided corresponding to each filter. For example, the following method is possible. After the light amount is adjusted, with the maximum output (referred to as Vm) of a bit out of all the sensor elements being a target, the correction coefficient is acquired for each sensor element such that outputs of the other sensor elements corresponding to the same color filter can be equalized with Vm. Then, with respect to each of sensor elements or pixels corresponding to the other color filters, its correction coefficient is acquired such that a ratio of each output relative to the reference output Vm can satisfy the R, G and B output ratio of x:y:z obtained by detecting light reflected from the ideal rich K toner patch.

Figure 9:
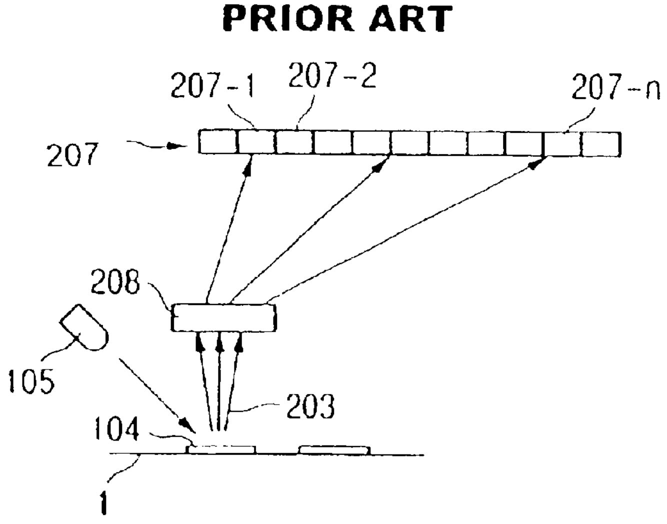
FIG. 9 PRIOR ART
FIG. 9 is a view illustrating a sensor for detecting the color tint of light from a patch using diffraction.

Further, a similar correction method can be executed also in the case of the sensor of a spectral system as illustrated in FIG. 9. This correction method differs from that of the case using the R, G and B color filters in the following point. Since light reflected by the ideal rich K toner patch enters the sensor after being subjected to conversion into its spectrum, an output for each spectrum width incident on each sensor element is calculated without using the spectrum transmissivity of each color filter, when an ideal output ratio of respective sensor elements is to be acquired, though the spectrum reflectivity of the detection object, the emission spectrum of the light source, and the spectrum sensitivity of the sensor are used.

Furthermore, even in the case where plural light sources, such as R, G and B LEDs, are provided for a sensor comprised of at least one pixel having a common spectral characteristic, the respective light sources are independently radiated, and color tint of the toner on the transferring material is detected based on the sensor output corresponding to each light source, the following method similar to the above method can be adopted. In this method, emission spectrum dispersion of the light source, and spectral sensitivity dispersion of the sensor element (in the case in which the sensor is comprised of plural sensor elements or pixels) can be similarly corrected by detecting light reflected from the ideal rich K toner patch.

As described in the foregoing, in the first embodiment, dispersions of R, G and color filters for detecting color tint and density of the toner patch, or dispersions of sensor elements for detecting color tint and density of the toner patch in the spectrum-obtaining system using the diffraction grating or prism, are corrected based on light reflected by the rich K toner patch which receives no influence of the transferring material. Therefore, it is possible to accurately detect the color tint of the toner patch without using the white-color reference, and a highly-reproducible color image forming apparatus can be provided. The rich K toner patch can serve as a reference reflective object for correcting the sensor without being influenced by the transferring material and without using the white-color reference which is likely to raise the cost and be contaminated.

(Second Embodiment)

When light reflected by the rich K toner patch 101 is detected as in the first embodiment, a signal level tends to decrease and influence of a quantization error is liable to be large during its AD (analog-digital) conversion, as compared with the case where light reflected by a normal patch is detected. Accordingly, S/N tends to be lower for those reasons and others. A second embodiment is directed to a shading correction method which is improved in this respect.

Figure 3:
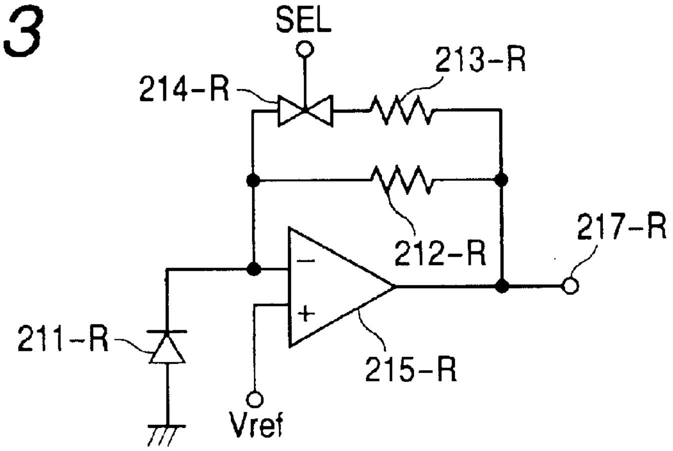
FIG. 3 is a view illustrating an IV converting circuit used in a second embodiment according to the present invention.

The second embodiment features that when a sensor of a type reading photocurrent generated in a photodiode or photo-transistor by the IV conversion is used as illustrated in FIG. 8A, a reading gain is changed between a case where a normal patch is detected and a case where a rich K toner patch for correction of variations is detected. FIG. 3 illustrates a circuit for describing the second embodiment with respect to a pixel corresponding to a filter (here an R filter). A resistance value for the IV conversion can be switched by a control signal SEL. An anodic side of a photodiode 211-R is connected to ground (GND), and its cathodic side is connected to an inverted input terminal of an operational amplifier 215-R, one terminal of an analog switch 214-R, and one end of a resistor 212-R. A reference voltage Vref is connected to a non-inverted input terminal of the operational amplifier 215-R. The other end of the resistor 213-R, whose one end is connected to the other terminal of the analog switch 214-R, is connected to the other end of the resistor 212-R and an output terminal of the operational amplifier. An output of an IV converted signal 217-R appears at such connection point. When a normal toner patch is detected, a logic is so established that the control signal SEL turns on the analog switch 214-R. If the resistance value of the analog switch 214-R is much smaller than that of the resistor 213-R and is negligible, the IV conversion of photocurrent generated in the photodiode 211 -R is executed by a resistance value created by parallel connection of the resistors 213-R and 212-R. The output is Vref when dark, and increases as the light amount increases.

On the other hand, when a rich K toner patch having low reflectivity is detected to perform the shading correction, a logic is so established that the control signal SEL turns off the analog switch 214-R. The IV conversion is executed only by the resistor 212-R. In this case, the resistance value is larger than that of the parallel connection of the resistors 212-R and 231-R, so that the gain of the IV conversion increases. Accordingly, even when photocurrent generated in the photodiode 211-R is relatively small due to low reflectivity of the patch, it is possible to obtain a sufficiently large signal amplitude. The influence of quantization error and noise error during the AD conversion can hence be reduced.

The reading method for increasing the gain when light reflected by the rich K toner patch is to be detected is not limited to the method of FIG. 3 wherein the photodiode is read using the operational amplifier. Any reading method capable of achieving the same effect can be used. For example, it is possible to adopt a method in which a resistor and a switch are provided parallel to the resistor 204-R in FIGS. 8A and 8B, and the gain at the time of IV conversion is changed by switching the switch ON and OFF.

Figure 4:
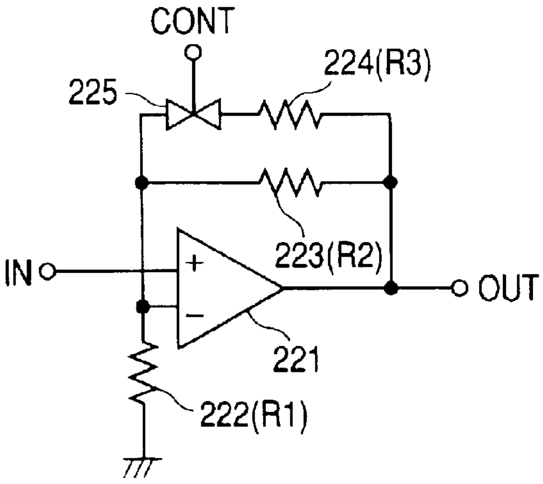
FIG. 4 is a view illustrating an example of a gain-variable amplifier.

Further, it is also possible to use a method in which a gain-variable amplifier 221 as illustrated in FIG. 4 is provided prior to the AD conversion and after the IV conversion, and a signal generated by the IV conversion is amplified.

In FIG. 4, more specifically, when a signal corresponding to light reflected by the rich K toner patch is read for shading correction, an analog switch 225 is set so as to turn off a logic of a control signal CONT. Where resistance values of resistors 222, 223 and 224 are R1, R2 and R3, the gain is equal to 1+R2/R1 when ON resistance of the analog switch is negligibly small relative to R3. On the other hand, when a normal patch is read, the logic of the control signal CONT is set so as to turn on the analog switch 225. The gain of this case is 1+(R2//R3)/R1 where R2//R3=(R2×R3)/(R2+R3) which is a combined resistance in a parallel connection of R2 and R3. The former gain is larger than the latter gain, so that the signal can be read with an enlarged amplification factor when the rich K toner patch is detected.

As described in the foregoing, in the second embodiment, when variations of the sensor are corrected based on light reflected by the rich K toner patch, the reading gain is made larger than that in the normal patch detection. Accordingly, influences of quantization error and noise error can be reduced during operation for detecting the signal from the rich K toner patch having low reflectivity, and more accurate detection can be achieved.

(Third Embodiment)

Where the sensor is a sensor of a type, such as a CMOS sensor and a CCD, in which generated photocurrent is read after being stored for a predetermined time, a decrease in a signal level, which is likely to occur when light reflected by the rich K toner patch is detected, can be prevented by changing the storage time. Highly-precise detection can thus be performed. Here, a shading correction method using such a storage sensor will be described.

Figure 5:
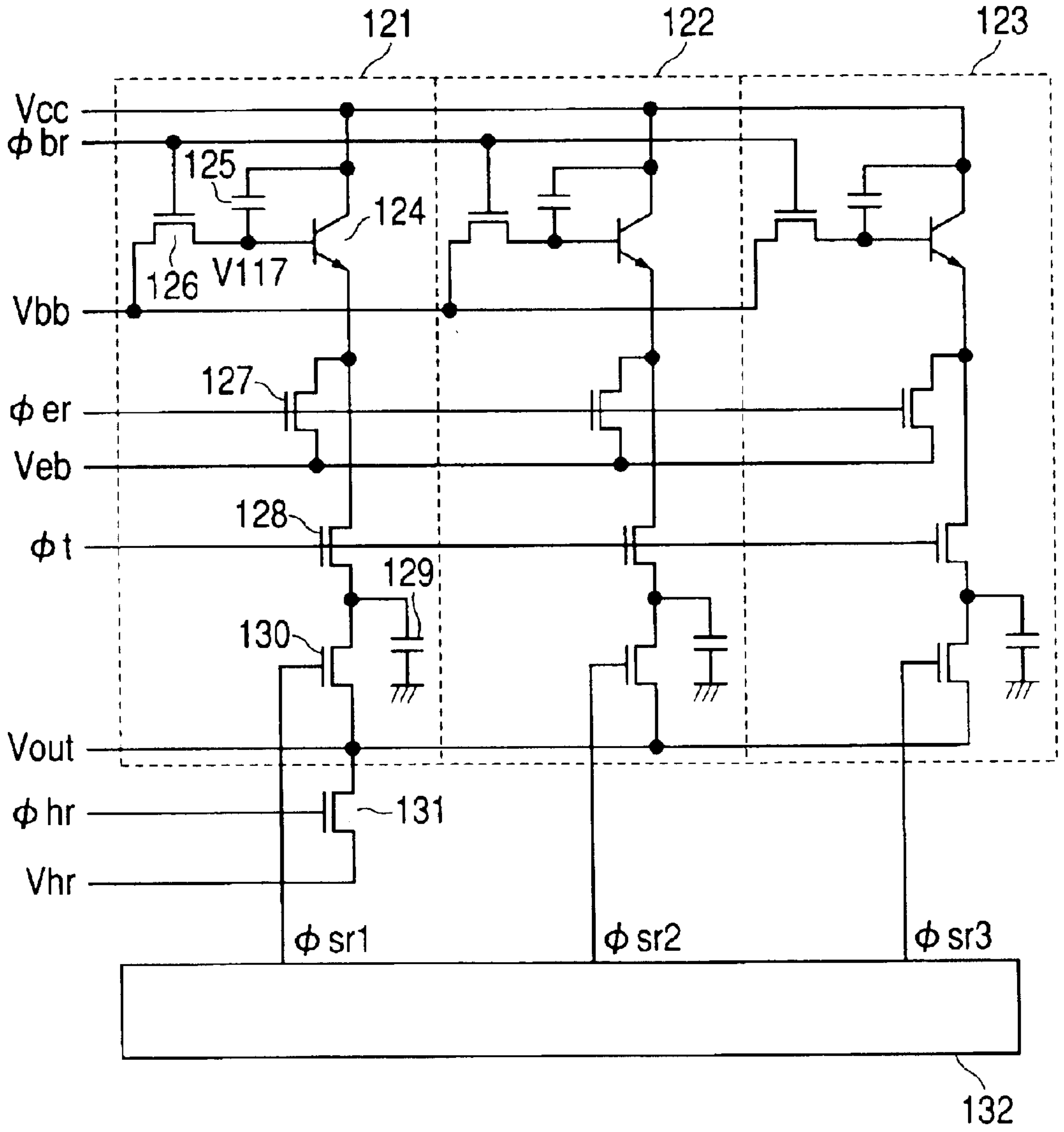
FIG. 5 is a view illustrating the structure of a storage sensor used in a third embodiment according to the present invention.

An example of the storage sensor will be described with reference to FIG. 5. In FIG. 5, denoted at 121 is an equivalent circuit of a pixel in a bipolar-type storage sensor BASIS (Base Stored Image Sensor) proposed by Canon. Denoted at 124 is a bipolar transistor for detecting light with a high current amplification factor. Denoted at 125 is a capacitance between base and collector which serves to store charges. Denoted at 126 is a PMOSFET for resetting a base voltage to Vbb based on a base reset signal ϕbr. Denoted at 127 is an NMOSFET for performing emitter reset based on an emitter reset signal ϕer. Denoted at 128 is an NMOSFET for transferring a batch of outputs from respective sensors to a capacitor 129 based on a transfer signal ϕt. Denoted at 130 is an NMOSFET for outputting charges transferred to the capacitance 129 to an output line Vout based on an output ϕsr1 of a shift register 132. Denoted at 131 is an NMOSFET for resetting the output line Vout to a voltage Vhr based on an output line reset signal ϕhr. In the sensor structure of FIG. 5, three pixel portions 121, 122 and 123 are provided corresponding to respective colors of R, G and B, and an on-chip color filter is provided on each pixel. It is thus possible to detect signals of three colors R, G and B out of the reflected light. By performing the AD conversion of the signal supplied to the output line Vout, it is possible to obtain a signal which is produced by storing, for a predetermined time, light corresponding to each wavelength range of R, G and B out of light reflected by the toner surface. Each driving signal is supplied from a CPU or the like (not shown) for controlling the operation of the image forming apparatus.

Figure 6:
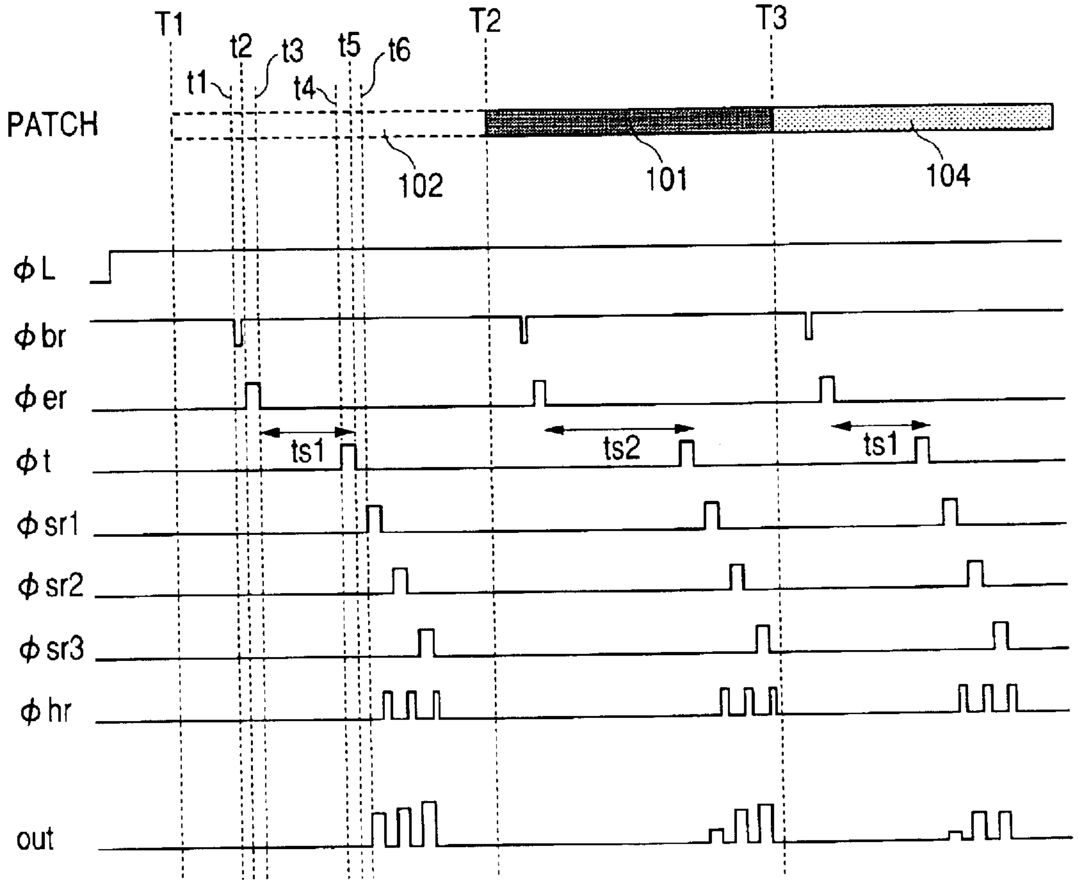
FIG. 6 is a timing chart illustrating the operation of the storage sensor as illustrated in FIG. 5.

Operation of the storage sensor of the third embodiment will be described with reference to a timing chart of FIG. 6.

A patch to be detected is formed on the transferring material 1 (here a sheet of paper). After ϕL is turned HIGH and the light source is hence switched on, the light amount is adjusted during a period from time T1 to time T2. In other words, the signal stored during a predetermined storage period ts1 is read, and light reflected by the transferring material 1 is detected. Based on this output, the light amount is adjusted such that the maximum value of the sensor output can show a sufficiently large amplitude within the non-saturation range for the storage period ts1. More specifically, current supplied to the light source such as the LED (not shown) is increased or decreased. Light reflected by the rich K patch is then detected in a period from time T2 to time T3. In this case, since the reflectivity of the rich K patch 101 is much smaller than that of the transferring material 1, the storage period is changed to ts2 (ts2>ts1) to enlarge the amplitude of the sensor output, thereby reducing a ratio of quantization error during the AD conversion and error due to noise. Then, from time T3, a series of patches 104 for color stabilization are detected with the storage period ts1. The shading correction is performed by using the thus-obtained data considering a difference in the storage period (for example, multiplying the A/D converted signal from the rich K patch by ts1/ts2).

The storage sensor operates in the following manner. Initially, sensor reset pulses ϕbr and ϕer with predetermined pulse widths are generated to reset the sensor. Specifically, ϕbr is turned LOW at time t1 to turn on the PMOSFET 126, and the base of the transistor 124 is reset to Vbb. At time t2, ϕer is turned HIGH to turn on the NMOSFET 127, and the emitter of the transistor 124 is reset to approximately Veb. Thus, the base potential of the transistor 124 decreases according to the emitter potential. At time t3, ϕer is turned LOW to bring both the emitter and the base of the transistor 124 into floating conditions, and the sensor starts to store charges.

After a predetermined storage period (ts1 or ts2) elapses, ϕt is turned HIGH in a period from time t4 to time t5 to transfer the stored signal to the capacitor 129, thereby finishing the storage operation. After that, the shift resistor 132 is operated at time t6 or thereafter to turn on the NMQS 130, and the output of the sensor is read out to Vout. The read signal is AD-converted by an AD converter (not shown), and is stored in a memory in the CPU (not shown) for controlling the operation of the image forming apparatus.

After the output of one sensor is read, the output line is reset to Vhr by the NMOSFET 131 when ϕhr is turned HIGH. The shift register 132 turns ϕsr2 and ϕsr3 on one after another, and subsequent sensor outputs corresponding to G and B filters are thus read. This operation is repeated with intervals between the patches to obtain data for the shading correction and data for the color tint stabilization.

As described in the foregoing, in the third embodiment, when the signal from the rich K toner patch for dispersion correction is to be detected, the storage period is made longer than that for detection of the signal from the patch for color tint detection. Accordingly, the sensor output of the signal from the rich K toner patch can be enlarged, and it is possible to reduce influences of quantization error and error due to noise during the detection period of the signal from the rich K toner patch having low reflectivity. Thus, more accurate detection can be achieved.

(Fourth Embodiment)

Figure 7:
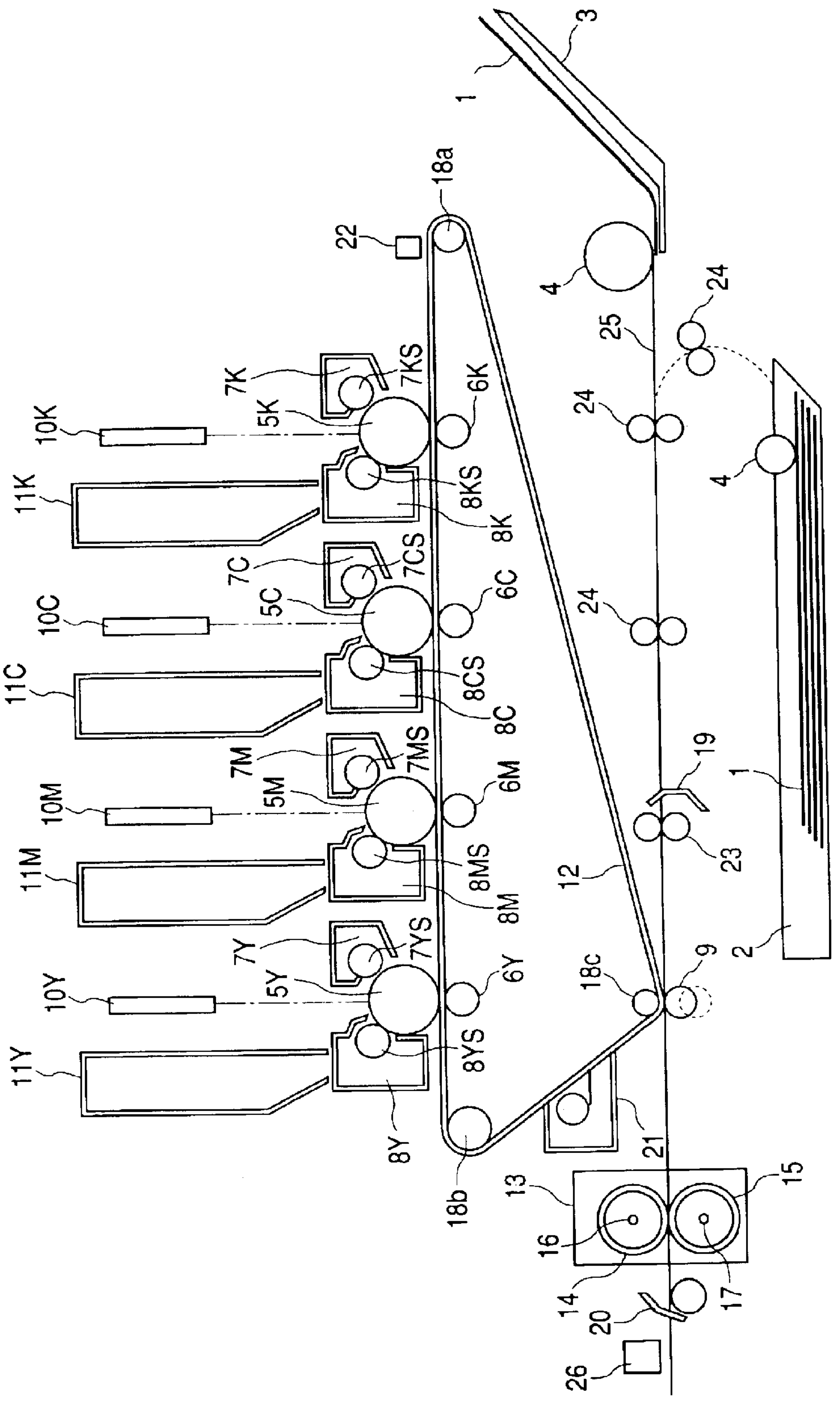
FIG. 7 is a cross-sectional view illustrating the structure of a color image forming apparatus of a fourth embodiment according to the present invention.

FIG. 7 illustrates the structure of a fourth embodiment of a color image forming apparatus or a color laser printer which includes a sensor for detecting the color tint of toner for shading correction according to the present invention. In the color image forming apparatus, an electrostatic latent image is formed with image light formed on the basis of image signal in its image forming portion, the electrostatic latent image is developed to form a visible image, the visible color image is transferred to a transferring material which is a recording medium, and the visible color image is fixed.

The image forming portion includes a development-color number of photosensitive drums 5Y, 5M, 5C and 5K arranged in parallel in respective stations, injection charging units 7Y, 7M, 7C and 7K serving as primary charging units, developing units 8Y, 8M, 8C and 8K, toner cartridges 11Y, 1M, 11C and 11K, an intermediate transfer member 12, sheet feeders 2 and 3, a transferring portion 9, and a fixing portion 13.

Each of the photosensitive drums 5Y, 5M, 5C and 5K is constructed by forming an organic photoconductive layer on an outer circumferential surface of an aluminum cylinder, and is rotated by a driving force transmitted from a driving motor (not shown). The driving motor rotates each of the photosensitive drums 5Y, 5M, 5C and 5K in a counterclockwise direction in accordance with the image forming operation. Exposure light is supplied to each of the photosensitive drums 5Y, 5M, 5C and 5K from each of scanner portions 10Y, 10M, 10C and 10K such that a surface of each of the photosensitive drums 5Y, 5M, 5C and 5K can be selectively exposed to light. Thus, electrostatic latent images are sequentially formed on those photosensitive drums.

Four injection charging units 7Y, 7M, 7C and 7K serving as primary charging units are provided in respective stations to charge the photosensitive drums of yellow (Y), magenta (M), cyan (C) and black (K), respectively. The injection charging units 7Y, 7M, 7C and 7K are provided with sleeves 7YS, 7MS, 7CS and 7KS, respectively.

Four developing devices 8Y, 8M, 8C and 8K for performing developments of yellow (Y), magenta (M), cyan (C) and black (K) are provided in the respective stations to visualize the electrostatic latent images, respectively. Each developing device is provided with each of sleeves 8YS, 8MS, 8CS and 8KS. Each developing device is detachably attachable to a main body of the apparatus.

The intermediate transfer member 12 is an endless belt member extended around a driving roller 18*a* and follower rollers 18*b* and 18*c*, and establishes contact with the photosensitive drums 5Y, 5M, 5C and 5K. The intermediate transfer member 12 is rotated in a clockwise direction during the image forming operation, and is sequentially subjected to transfer of each color under each action of primary transferring rollers 6Y, 6M, 6C and 6K for respective colors.

The transferring materials 1 are stored in a sheet cassette 2 or a sheet tray 3 serving as the sheet feeder (a sheet feeding port). The transferring material 1 is conveyed along a conveyance path 25 composed of a sheet feeding roller 4, conveying rollers 24, and the like, and reaches a registration roller 23. This arrival is detected by a pre-registration sensor 19.

During the image forming operation, conveyance of the transferring material 1 is stopped by the pre-registration sensor 19 for a predetermined time in synchronization with the timing of arrival of the visible color images on the intermediate transfer member 12 at a transferring region. The transferring material 1 is fed to the transferring region from the registration roller 23, and a secondary transferring roller 9 is brought into press contact with the intermediate transfer member 12 to nip and convey the transferring material 1, thereby simultaneously transferring visible color images on the intermediate transfer member 12 to the transferring material 1 in a superposed manner.

The secondary transferring roller 9 is brought into contact with the intermediate transfer member 12 as indicated by the solid line in FIG. 7 during the superposed transferring operation of the visible color images onto the intermediate transfer member 12, but is brought to a location away from the intermediate transfer member 12 as indicated by the dotted line in FIG. 7 at the end of printing process.

The fixing portion 13 fixes the transferred visible color images while conveying the transferring material 1. The fixing portion 13 includes a fixing roller 14 for heating the transferring material 1, and a pressing roller 15 for bringing the transferring material 1 and the fixing roller 14 into press contact with each other. Each of the fixing roller 14 and the pressing roller 15 has an inner hollow space, and heaters 16 and 17 are disposed in these spaces, respectively. In other words, the transferring material 1 bearing the visible color images is conveyed by the fixing roller 14 and the pressing roller 15, and at the same time the toners are fixed to a surface of the transferring material 1 by heat and pressure from the rollers 14 and 15.

The transferring material 1 subjected to fixation of the visible color images is then discharged to a sheet discharge portion (not shown) by a discharging roller (not shown). The image forming operation is thus finished. Discharge of the transferring material 1 from the fixing portion 13 is detected by a sensor 20 of fixation and sheet discharge.

A cleaning unit 21 stores waste toners remaining after four visible color images formed on the intermediate transfer member 12 are transferred to the transferring material 1.

A unit 22 for detecting chromatic deviations serves to form a patch for detection of chromatic deviations on the intermediate transferring material 12, and detect amounts of deviations in main scanning and sub-scanning directions between respective colors. The chromatic deviation detecting unit 22 executes such feedback that chromatic deviations can be reduced by fine adjustment of image data.

An electric control system in the above-discussed color image forming apparatus will be described with reference to FIG. 10.

Figure 10:
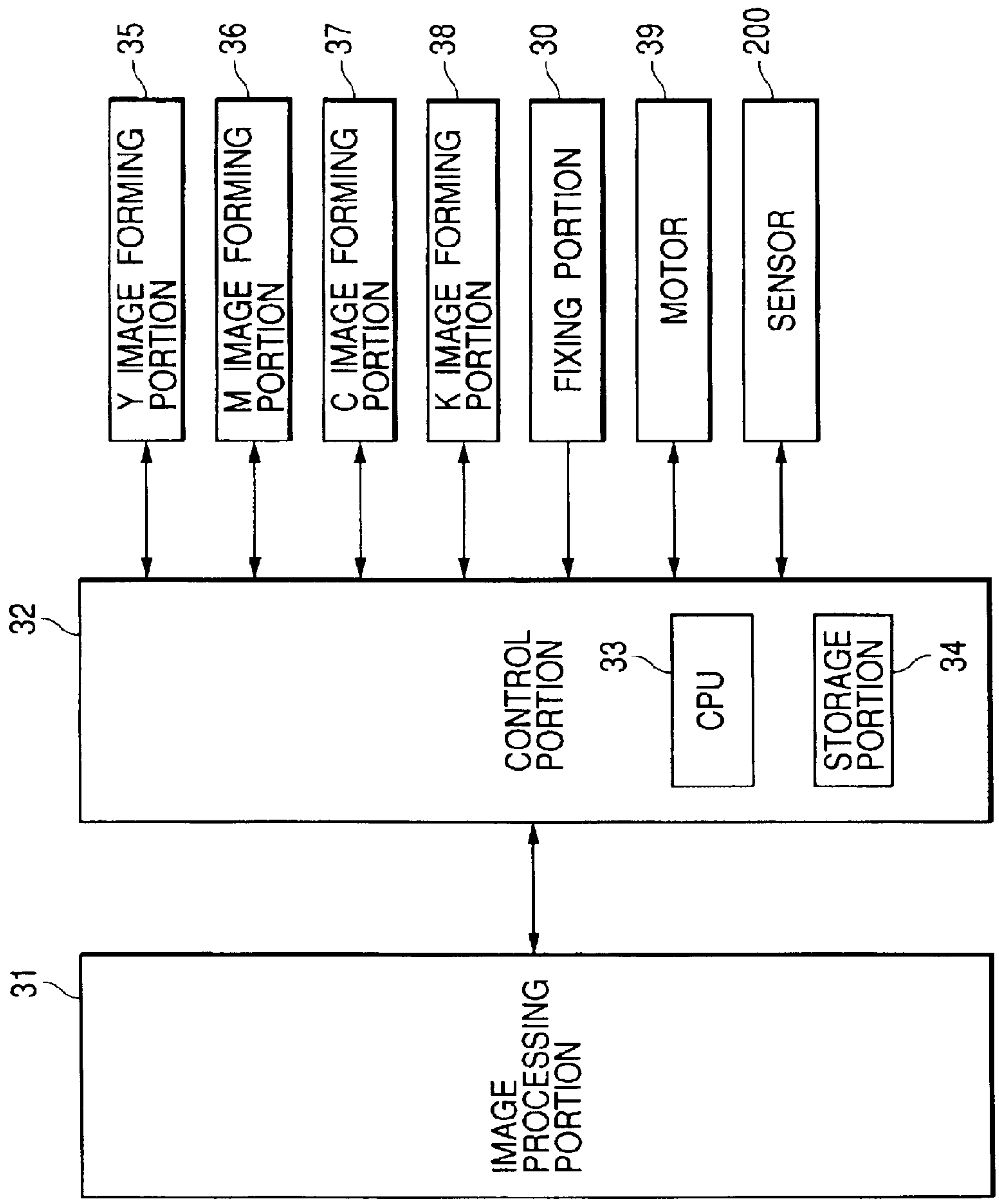
FIG. 10 is a view illustrating an electrical control system in the color image forming apparatus of the fourth embodiment.

In FIG. 10, denoted at 31 is an image processing portion for generating image data. The image processing portion 31 not only receives a print job from a host computer (not shown) to develop it to image data to be formed in the color image forming apparatus, but also performs various image processings based on the lookup table and the like stored therein. Denoted at 35 to 38 are image forming portions for forming colored images of yellow, magenta and cyan, and a non-colored image of black, respectively. Denoted at 30 is a fixing portion for fixing the formed images to the transferring material. Denoted at 39 is a motor for rotating various devices in connection with the image forming, and various rollers for conveying the transferring material. Denoted at 200 is the above-discussed sensor.

Further, denoted at 32 is a control portion. The control portion 32 controls the above-noted color image forming portions 35 to 38, the fixing portion 30, the motor 39, and others to form the images. The control portion 32 further executes the flow chart as illustrated in FIG. 1B to perform the shading correction of the sensor, and executes various sequences. Furthermore, the control portion 32 includes a CPU 33, a storage portion 34, and the like therein. The storage portion 34 not only stores programs to be executed by the CPU, but also the shading correction values.

When the above-discussed image forming apparatus is employed, obtainable density and chromaticity of an image are likely to fluctuate if variations occur in each portion of the apparatus due to changes in its ambience and its longtime use. Particularly, in the case of a color image forming apparatus of an electrophotographic type, there is a fear that colors lose the balance between them even in the event of slight fluctuations in their densities, and accordingly constant density and gradation need to be maintained for each color at all times.

Therefore, for each color toner, there are prepared several kinds of process conditions of exposure amount, developing bias, and the like corresponding to respective absolute humidities, and a gradation correcting unit such as a lookup table (LUT). Based on the absolute humidity measured by a temperature-humidity sensor (not shown), appropriate process condition and gradation correction value are selected on each occasion. Further, in order to obtain constant density, gradation, and color tint even if variations occur in each portion of the apparatus during its use, a toner image (a patch or a toner patch) for detecting the density is formed with each toner on the intermediate transfer member, and the patch is detected by an optical sensor which is disposed at a location equivalent to the location of the chromatic deviation detecting unit 22. Thus-detected results are fed back to the process conditions of the exposure amount and the developing bias, and the like to control the density of each color such that a stable image can be obtained.

Furthermore, there is provided a sensor for detecting the color tint of the toner patch at a location 26 such that feedback can be executed with respect to factors including influences of transfer and fixation which are excluded from feedback objects, and influence at the time of mixing colors which cannot be detected. Based on results detected by this sensor, feedback operations are performed to the process conditions and image processing such that color stabilization of the image can be further improved.

In this embodiment, shading correction of the sensor 26 mounted to the above-discussed color image forming apparatus is performed based on light reflected by the rich K toner patch which receives no influence of the transferring material as described in the first to third embodiments. Therefore, it is possible to accurately detect the color tint of the toner patch without using the white-color reference that is likely to raise the cost and be contaminated, and a highly-reproducible color image forming apparatus can be provided. Further, color tint of an image after being subjected to fixation or printing can be accurately detected, and therefore a color image forming apparatus with high chromatic stability can be provided.

Since the shading correction values are appropriately set as discussed above, shading correction subsequent thereto can be appropriately executed on sensor values of toner patches for setting the color image forming conditions. Further, various color image forming conditions, such as those of the LUT and a high-voltage portion, can be set based on those shading-corrected sensor output values.

With respect to a way to form the patch, and a way to feed the detected signals back to the image forming apparatus, detailed description is omitted since these are conventional techniques.

Further, description has been made of a color image forming apparatus of an electrophotographic type in the foregoing, but the apparatus is not limited thereto. The present invention can also be applied to other color image forming apparatuses, such as a printer of an ink-jet type, in which it is possible to detect the color tint of ink on the transferring material using the above-discussed sensor, and an image with stable color tint can be obtained by feeding detected results back to the injection amount of the ink.

In the above-discussed embodiments, shading correction of the sensor for detecting color tint and density of the toner patch is performed based on light reflected by the rich K toner patch formed on the transferring material, and it is possible to accurately detect the color tint of the toner patch without using the white-color reference.

Further, when shading correction is performed based on light reflected by the rich K toner patch, the reading gain is made larger than that in the normal patch detection. Accordingly, influences of quantization error and noise error can be reduced during operation for detecting the signal from the rich K toner patch having low reflectivity, and more accurate detection can be achieved.

Further, when shading correction of the storage sensor is performed based on light reflected by the rich K toner patch, the storage period is made longer than that for detection of the normal patch. Accordingly, it is possible to reduce influences of quantization error and error due to noise during the detection period of the signal from the rich K toner patch having low reflectivity, and more accurate detection can be achieved.

Furthermore, there is provided in the color image forming apparatus the sensor for performing shading correction based on light reflected by the rich K toner patch on the transferring material. Therefore, it is possible to accurately detect the color of an image after being subjected to fixation, and an image forming apparatus with high chromatic stability can be provided.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image forming apparatus comprising:

a sensor adapted to detect chromaticity of a patch to be formed on a transferring medium;

a correcting unit that performs shading correction of an output from said sensor;

an adjusting unit that adjusts the color image forming conditions based on a corrected output from said correcting unit when said sensor detects a patch for adjustment of color image forming conditions to be formed on a transferring medium; and a calculating unit that calculates a shading correction value of said correcting unit based on a detected value when said sensor detects a patch for calculation of the shading correction value.

2. A color image forming apparatus according to claim 1, wherein the patch for calculation of the shading correction value is a black toner patch whose optical density is equal to or more than one.

3. A color image forming apparatus according to claim 1, wherein said sensor is a sensor comprised of a light source having an emission spectrum ranging over overall visible light, and at least three sets of pixels provided with respective filters having respective spectral characteristics, and said calculating unit obtains such correction coefficients that outputs from said respective pixels of said sensor can satisfy a predetermined output ratio calculated from the emission spectrum of said light source, spectral sensitivity of said sensor, spectral transmissivities of said respective filters, and spectral reflectivity of toner.

4. A color image forming apparatus according to claim 1, wherein said sensor is a sensor comprised of a light source having an emission spectrum ranging over overall visible light, spectrum-obtaining means, and a plurality of pixels for receiving spectral light obtained by said spectrum-obtaining means, and said calculating unit obtains such correction coefficients that outputs from said respective pixels of said sensor can satisfy a predetermined output ratio calculated from the emission spectrum of said light source, spectral sensitivity of said sensor, spectral reflectivity of toner, and wavelength ranges of light incident on said respective pixels, and corrects the output of said sensor using the correction coefficients during operation for detecting color tint of an image formed on the transferring medium.

5. A color image forming apparatus according to claim 1, wherein said sensor is a sensor comprised of at least three light sources having respective different emission spectra, and a pixel or at least two pixels having equal spectral sensitivity, and said calculating unit obtains such individual correction coefficients that outputs from said respective pixels of said sensor corresponding to said respective light sources can satisfy a predetermined output ratio calculated from the emission spectra of said light sources, spectral sensitivity of said sensor, and spectral reflectivity of toner.

6. A color image forming apparatus according to claim 1, wherein said sensor is a sensor whose amplification factor during operation for converting incident light into a voltage is variable, or a sensor in which a voltage obtained by conversion from incident light is amplified by an amplifier with a variable amplification factor, and the amplification factor is set to a relatively large value during operation for obtaining shading connection information of said sensor, and is set to a relatively small value during operation for detecting color tint of an image formed on the transferring material.

7. A color image forming apparatus according to claim 1, wherein said sensor is a charge storage sensor which reads charge generated by incident light after charge storage for a predetermined time, and storage time is set to a relatively long time during operation for shading correction of said sensor, and is set to a relatively short time during operation for detecting color tint of an image formed on the transferring material.

8. A color image forming apparatus according to claim 1, further comprising:

a plurality of image forming portions that form images of different colors; and a transferring portion that transfers the images formed by said image forming portions to the transferring material to form a color image on the transferring material.

9. A shading correction method for a sensor for detecting chromaticity of a patch to be formed on a transferring medium by a color image forming apparatus, said shading correction method comprising:

a first detecting step of detecting, by the sensor, a patch for calculation of a shading correction value to be formed on a transferring medium by the color image forming apparatus;

a calculating step of calculating the shading correction value of a correcting unit based on a detected output obtained in said first detecting step;

a second detecting step of detecting, by the sensor, a patch for adjustment of color image forming conditions;

a correcting step of correcting an output of the sensor obtained in said second detecting step based on the shading correction value; and an adjusting step of adjusting the color image forming conditions based on a corrected output obtained in said correcting step.

* * * * *

UNITED STATES PATENT AND TRADEMARK OFFICE

CERTIFICATE OF CORRECTION

PATENT NO. : 6,959,157 B2 
DATED : October 25, 2005
INVENTOR(S) : Toshiki Nakayama It is certified that error appears in the above-identified patent and that said Letters Patent is hereby corrected as shown below:

Column 8,
Line 42, "211 -R" should read -- 211-R --.

Column 9,
Line 51, "capacitance" should read -- capacitor --.

Column 10,
Line 41, "NMQS" should read -- NMOSFET --.

Signed and Sealed this

Twenty-fifth Day of April, 2006

JON W. DUDAS
*Director of the United States Patent and Trademark Office*